United States Patent
Danon et al.

(10) Patent No.: US 12,556,951 B2
(45) Date of Patent: Feb. 17, 2026

(54) MACHINE LEARNING BASED NETWORK DRIVE TEST PRIORITIZATION

(71) Applicant: DISH Wireless L.L.C., Englewood, CO (US)

(72) Inventors: Tomer Danon, Denver, CO (US);
Ahmed Alkarboly, Denver, CO (US);
Jennings Orcutt, Denver, CO (US);
David Ricardo Bentolila Sapiani, Littleton, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 345 days.

(21) Appl. No.: 18/489,800

(22) Filed: Oct. 18, 2023

(65) Prior Publication Data

US 2025/0133427 A1    Apr. 24, 2025

(51) Int. Cl.
*H04J 3/14* (2006.01)
*H04L 41/16* (2022.01)
*H04W 24/08* (2009.01)

(52) U.S. Cl.
CPC .............. *H04W 24/08* (2013.01); *H04L 41/16* (2013.01)

(58) Field of Classification Search
CPC ...... H04W 24/08; H04W 24/10; H04L 41/16; H04L 43/50; H04L 47/10; H04L 12/2697; H04L 43/0852; H04L 43/00
See application file for complete search history.

(56) References Cited

U.S. PATENT DOCUMENTS

| | | | |
|---|---|---|---|
| 2019/0246298 A1* | 8/2019 | Roman | H04W 24/08 |
| 2021/0326680 A1* | 10/2021 | Chaaraoui | G06N 3/048 |
| 2025/0148365 A1* | 5/2025 | Padfield | G06N 3/096 |

OTHER PUBLICATIONS

Topic et al, Neural Network-Based Prediction of Vehicle Fuel Consumption Based on Driving Cycle Data, Jan. 10, 2022, MDPI, Sustainability 14-00744, pp. 1-12 (Year: 2022).*
Yao et al, Vehicle Fuel Consumption Prediction Method Based on Driving Behavior Data Collected from Smartphones, Mar. 23, 2020, Hindawi, Journal of Advanced Transportation, vol. 2020, Article ID 9263605, pp. 1-11(Year: 2020).*

* cited by examiner

*Primary Examiner* — Phuongchau Ba Nguyen
(74) *Attorney, Agent, or Firm* — Seed Intellectual Property Law Group LLP

(57) ABSTRACT

Technologies for network drive test prioritization based on machine learning are disclosed. An example method includes feeding a representation of routes of a target candidate drive test to a trained machine learning model to obtain a drive test prediction, wherein the trained machine learning model is trained based on integrating radio frequency (RF) estimations or predictions with past drive test data. The method also includes sorting a set of candidate drive tests for the communications network including the target candidate drive test, based on drive test predictions associated with each candidate drive test, to determine priorities for executing drive tests; and determining expectation of network usability in accordance with network availability and performance metrics.

20 Claims, 4 Drawing Sheets

MACHINE LEARNING BASED NETWORK DRIVE TEST PRIORITIZATION

BACKGROUND

In telecommunications, 5G is the fifth-generation technology standard for broadband cellular networks. 5G networks are cellular networks, in which the service area is divided into small geographical areas called cells. 5G wireless devices in a cell can communicate by radio waves with a cellular base station (e.g., located on a cellular tower) via fixed antennas, over frequency channels. The base stations can be connected to switching centers in the telephone network and routers for Internet access by high-bandwidth optical fiber or wireless backhaul connections. There is a need for technologies that facilitate efficient testing of cellular networks.

BRIEF SUMMARY

In some implementations of a communications network (e.g., a 5G network), the entirety or at least some components or elements of the network core (e.g., 5G core) can be implemented logically or virtually, via one or more cloud service providers. The network core communicates with various cell sites that are located in different geographic or network locations, subjecting to control of same or different entities.

For regulatory, industrial, or other reasons, coverage of a communications network may be required to meet certain performance requirements (e.g., throughput rate, download speed, etc.) for a service market, country, or region. To prove or demonstrate satisfaction of the requirements, conventional drive testing is typically performed to cover all parts of network coverage in a trial-and-error manner. Tediously performing drive tests on each and every part of the network can be cumbersome and taxing on any available computational, communication, hardware, and human resources.

In some embodiments, the presently disclosed technology provides a computer-implemented method for prioritizing drive tests for a communications network. The method includes: feeding a representation of one or more routes of a target candidate drive test for the communications network to a trained machine learning model to obtain a drive test prediction for the target candidate drive test, wherein the trained machine learning model is trained based on integrating estimated radio frequency (RF) measurements with past drive test data; sorting a set of candidate drive tests for the communications network including the target candidate drive test, based on drive test predictions associated with each candidate drive test of the set of candidate drive tests, to determine priorities for executing drive tests; and causing performance of drive testing for the communications network in accordance with the priorities.

In some embodiments, feeding the representation of one or more routes of the target candidate drive test to the trained machine learning model comprises determining at least one of a shape, coordinates, direction, or geographic location associated with the one or more routes. In some embodiments, feeding the representation of one or more routes of the target candidate drive test to the trained machine learning model further comprises obtaining estimated RF measurements for the target candidate drive test based on the at least one of a shape, coordinates, direction, or geographic location. In some embodiments, feeding the representation of the one or more routes of the target candidate drive test to the trained machine learning model further comprises inputting at least the estimated RF measurements for the target candidate drive test into the trained machine learning model.

In some embodiments, the drive test prediction for the target candidate drive test includes at least one of a distribution of predicted successes among fractions of the one or more routes, an unweighted overall predicted success rate for the target candidate drive test, or a weighted overall predicted success rate for the target candidate drive test.

In some embodiments, causing performance of drive testing for the communications network in accordance with the priorities comprises causing execution of one or more candidate drive tests each associated with a priority above a threshold. In some embodiments, the method further includes: withholding at least one candidate drive test that is associated with a priority below the threshold; determining at least one part of the communications network corresponding to the at least one candidate drive test that is associated with a priority below the threshold; and causing adjustment to at least one of a configuration, setting, or arrangement for the at least one part of the communications network.

In some embodiments, the method further includes causing updated training of the machine learning model based on the performance of drive testing.

In some embodiments, a drive test system for a communications network includes at least one memory that stores computer executable instructions and at least one processor that executes the computer executable instructions to cause actions to be performed. The actions include: feeding a representation of one or more routes of a target candidate drive test for the communications network to a trained machine learning model to obtain a drive test prediction for the target candidate drive test, wherein the trained machine learning model is trained based on integrating estimated radio frequency (RF) measurements with past drive test data; sorting a set of candidate drive tests for the communications network including the target candidate drive test, based on drive test predictions associated with each candidate drive test of the set of candidate drive tests, to determine priorities for executing drive tests; and causing performance of drive testing for the communications network in accordance with the priorities.

In some embodiments, feeding the representation of one or more routes of the target candidate drive test to the trained machine learning model comprises obtaining estimated RF measurements for the target candidate drive test based on the one or more routes. In some embodiments, feeding the representation of the one or more routes of the target candidate drive test to the trained machine learning model further comprises inputting at least the estimated RF measurements for the target candidate drive test into the trained machine learning model.

In some embodiments, the drive test prediction for the target candidate drive test includes at least one of a distribution of predicted successes among fractions of the one or more routes, an unweighted overall predicted success rate for the target candidate drive test, or a weighted overall predicted success rate for the target candidate drive test.

In some embodiments, causing performance of drive testing for the communications network in accordance with the priorities comprises causing execution of one or more candidate drive tests each associated with a priority above a threshold. In some embodiments, the actions further include: withholding at least one candidate drive test that is associated with a priority below the threshold; determining at least one part of the communications network corresponding to the at least one candidate drive test that is associated with a priority below the threshold; and causing adjustment to at least one of a configuration, setting, or arrangement for the at least one part of the communications network.

In some embodiments, the actions further include causing updated training of the machine learning model based on the performance of drive testing.

In some embodiments, a non-transitory computer-readable medium stores contents that, when executed by one or more processors, cause actions to be performed. The actions include: feeding a representation of one or more routes of a target candidate drive test for the communications network to a trained machine learning model to obtain a drive test prediction for the target candidate drive test, wherein the trained machine learning model is trained based on integrating estimated radio frequency (RF) measurements with past drive test data; sorting a set of candidate drive tests for the communications network including the target candidate drive test, based on drive test predictions associated with each candidate drive test of the set of candidate drive tests, to determine priorities for executing drive tests; and causing performance of drive testing for the communications network in accordance with the priorities.

In some embodiments, the representation of one or more routes of the target candidate includes estimated RF measurements associated with the one or more routes. In some embodiments, the drive test prediction for the target candidate drive test includes at least one of a distribution of predicted successes among fractions of the one or more routes, an unweighted overall predicted success rate for the target candidate drive test, or a weighted overall predicted success rate for the target candidate drive test.

In some embodiments, causing performance of drive testing for the communications network in accordance with the priorities comprises causing execution of one or more candidate drive tests each associated with a priority above a threshold. In some embodiments, the actions further include: withholding at least one candidate drive test that is associated with a priority below the threshold; determining at least one part of the communications network corresponding to the at least one candidate drive test that is associated with a priority below the threshold; and causing adjustment to at least one of a configuration, setting, or arrangement for the at least one part of the communications network.

DETAILED DESCRIPTION

Figure 1:
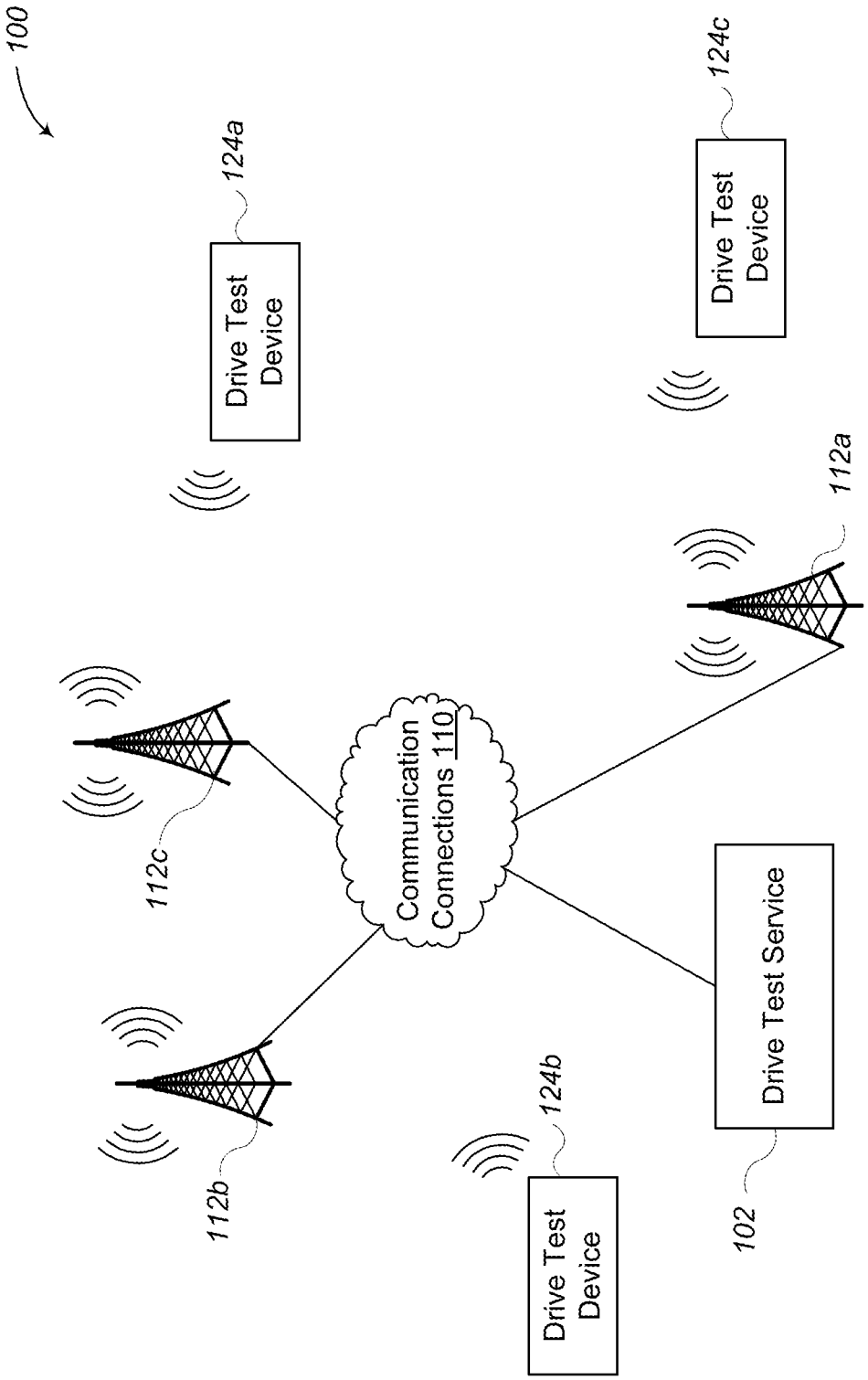
FIG. 1 is a block diagram illustrating an example networked environment for machine learning-based drive test prioritization for a communications network in accordance with some embodiments of the techniques described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is drawn. For instance, a subset of a set of ten items will have less than ten items and at least one item.

In some embodiments, the presently disclosed technology uses population distribution data (e.g., U.S. census) to provide a statistically significant representation of network performance. Drive tests can be automatically pathed and directed in association with a census track, census block, or other geographic unit of population. In some embodiments, automatic sampling of the geographic units is performed prior to drive test route planning and execution. As such, the presently disclosed technology can intelligently adapt to the geographic distribution of population, save significantly on resources required for drive tests, and reduce the load on network to prove or demonstrate satisfaction of coverage requirements.

FIG. 1 is a block diagram illustrating an example networked environment 100 for machine learning-based drive test prioritization for a communications network in accordance with some embodiments of the techniques described herein. Environment 100 includes a plurality of cells 112a-112c, a plurality of drive test devices 124a-124b, a drive test service 102, and communication connections 110. Illustratively, the cells 112a-112c correspond to cell sites (e.g., cellular towers) that together implement a 5G cellular communications network (or at least a service or function thereof), which can include established or proposed coverage. The cells 112a-112c may include or be in communication with base stations, radio back haul equipment, antennas, or other devices, which are not illustrated for ease of discussion.

Each cell 112 provides 5G compatible cellular communications over a coverage area. The coverage area of each cell 112 may vary depending on the elevation antenna of the cell, the height of the antenna of the cell above the ground, the electrical tilt of the antenna, the transmit power utilized by the cell, or other capabilities that can be different from one type of cell to another or from one type of hardware to another. Although embodiments are directed to 5G cellular communications, embodiments are not so limited and other types of cellular communications technology may also be utilized or implemented. In various embodiments, the cells 112a-112c may communicate with each other via communication connections 110. Communication connections 110 include one or more wired or wireless networks, which may include a series of smaller or private connected networks that carry information between the cells 112a-112c.

The drive test devices 124a-124c are mobile radio network air interface measurement equipment that can detect and record a wide variety of the physical and virtual parameters of mobile cellular service in a given geographical area, e.g., by communicating with one or more of the cells 112a-112c. One or more drive test devices can be installed on a mobile vehicle (e.g., mounted to a car, truck, or van that may or may not be autonomous) or be used as portable device(s) (e.g., carried by a person). The drive test devices can include highly specialized electronic devices that interface to OEM mobile handsets or other user equipment (UE), to facilitate measurements that are comparable to actual experiences of a user of the network. In various embodiments, the data collected by a drive test device during drive testing can include time-stamps identifying when the test was initiated or completed, latitude and longitude of the test, Cell ID of the serving cell or tower, frequency band(s), IMSI code of the mobile device used, download throughput, signal levels, signal quality, interference, dropped calls, blocked calls, anomalous events, call statistics, service level statistics, quality of service (QOS) information, handover information, neighboring cell information, GPS location coordinates, combination of the same or the like. The data collected can be compared with one or more performance criteria to determine whether a drive test is passed or otherwise satisfactory.

In various embodiments, the drive test service 102 can include one or more computing devices to implement machine learning-based drive test prioritization and related functions described herein. In various embodiments, the drive test service 102 interfaces or otherwise communicates with one or more elements of the 5G network core via the communication connections 110, with drive test devices (such as devices 124a-124c) directly or indirectly, with cell sites (e.g., cellular towers or controllers thereof), with other systems or devices external to the 5G network, or with a combination thereof. In some embodiments, the drive test service 102 is partly or entirely implemented inside or outside the 5G network core. In some embodiments, at least part of the drive test service 102 is implemented by one or more drive test devices 124a-124c.

The above description of the exemplary networked environment 100 and the various services, systems, networks, and devices therein is intended as a broad, non-limiting overview of an example environment in which various embodiments of the presently disclosed technologies may be implemented. FIG. 1 illustrates just one example of an operating environment, and the various embodiments discussed herein are not limited to such an environment. In particular, the networked environment 100 may contain other devices, systems, or media not specifically described herein.

Figure 2:
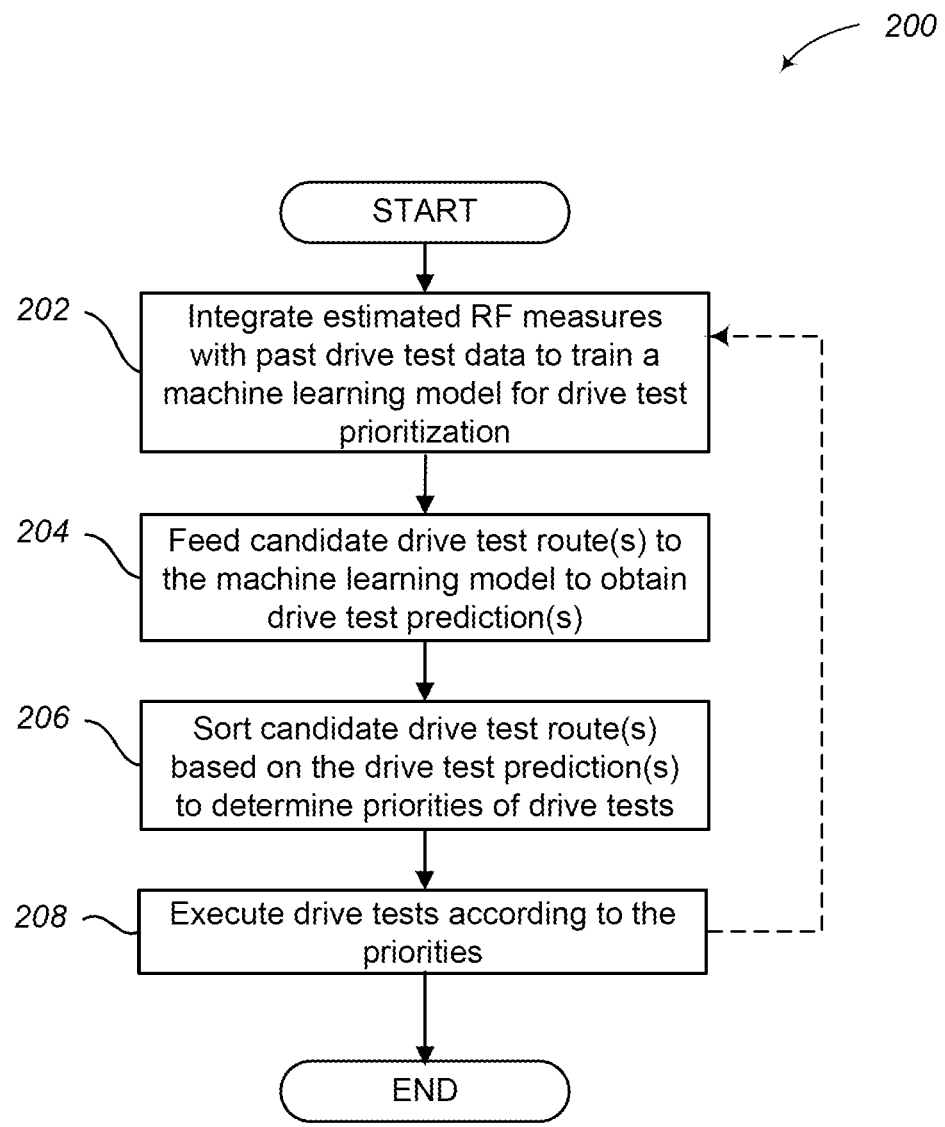
FIG. 2 is a flow diagram depicting an example process for machine learning-based drive test prioritization for a communications network in accordance with some embodiments of the techniques described herein.

FIG. 2 is a flow diagram depicting an example process 200 for machine learning-based drive test prioritization for a communications network (e.g., a 5G network as described above) in accordance with some embodiments of the techniques described herein. In various embodiments, at least part of the process 200 is performed in real time (e.g., relative to the generation or receiving of new estimated RF measures, new drive test data, or the like) and based on one or more drive test devices 124a-124c as they move along network coverage areas collecting data. Illustratively, at least some part of the process 200 can be implemented by the drive test service 102, or one or more drive test devices 124a-124c.

Figure 3:
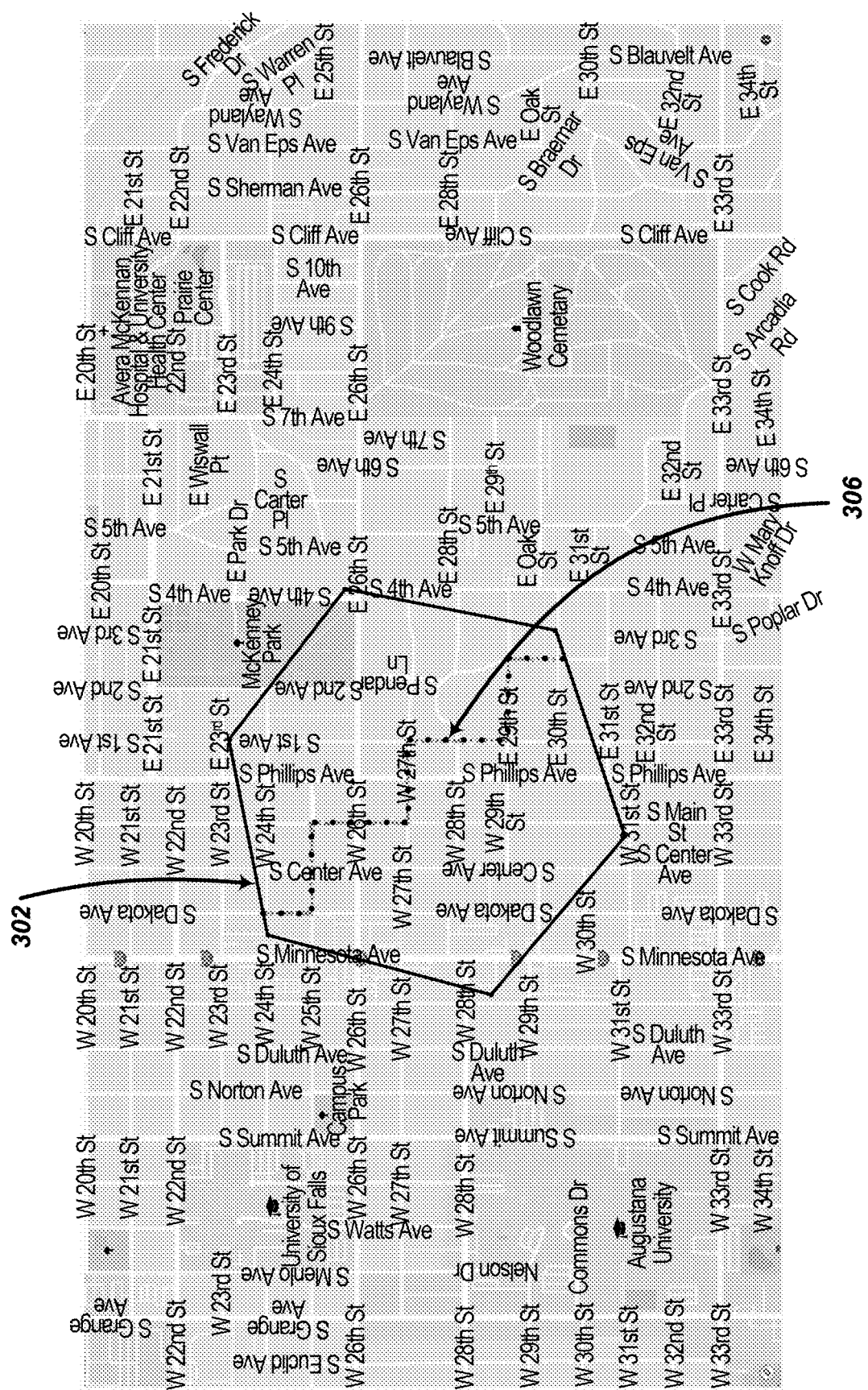
FIG. 3 illustrates an example geographic unit and route(s) of a drive test, in accordance with some embodiments of the techniques described herein.

The process 200 starts at block 202, which includes integrating simulated, predicted, or otherwise estimated RF measurements with existing drive test data to train a machine learning model (e.g., a neural network, support vector machine, decision tree, or the like) for drive test prioritization. As shown in FIG. 3, a drive test can correspond to a geographic unit 302 and include one or more drive test routes 306 within the geographic unit 302. The route(s) 306 may be connected or unconnected to one another, along which one or more drive test devices can be moved to collect data regarding the communications network.

The estimated RF measurements (e.g., regarding power, noise, modulation, or the like) can be received from a data source or service that outputs estimated RF measurements based on configurations, settings, or arrangement (e.g., tower locations or configurations) of the communications network. The integration of the data can include matching the estimated RF measurements with individual drive tests based on the shape, coordinates, direction, or geographic location associated with the route(s) of the drive test. The matching can be performed using nearest neighbor substitution, numerical interpolation or extrapolation, or other methods to correlate data points between estimated RF measurements and drive test route(s). In some embodiments, estimated RF measurements matched to a drive test include a field over the geographic unit of the drive test, a function over the route(s) of the drive test, or other mathematical descriptor(s) corresponding to the drive test. Given the integrated data and actual test results from the existing drive tests, the machine learning model can be trained to predict results of proposed candidate drive tests.

With reference to FIG. 2, at block 204, the process 200 includes feeding a representation of one or more routes of a target candidate drive test to the trained machine learning model to obtain drive test prediction(s). The feeding process can include determining at least one of a shape, coordinates, direction, or geographic location associated with the one or more routes, and obtaining estimated RF measurements for the target candidate drive test based thereon. The estimated RF measurements can be obtained from the same data source or service as used in the training phase, or from another data source or service implementing the same or similar RF estimation technology. The estimated RF measurements for the target candidate drive test can be input into the trained machine learning model. In some embodiments, at least one of the shape, coordinates, direction, or geographic location associated with the drive test route(s) can also be input into the trained machine learning model, depending on how the model is constructed and trained.

The drive test prediction(s) for the target candidate drive test is obtained from the output (or a part thereof) of machine learning model. The prediction(s) can include at least one of a distribution of predicted successes among fractions (e.g., points, segments, or the like) of the one or more routes, an unweighted overall predicted success rate (e.g., a percentage of the route(s) that passes the test) for the target candidate drive test, or a weighted (e.g., based on the length of route(s), resources required, service priority, or the like) overall predicted success rate for the target candidate drive test. The prediction(s) can include predicted measurements from the target candidate drive test, e.g., Received Signal Strength Indicator (RSSI), Reference Signal Receive Power (RSRP), Signal-to-Noise Ratio (SNR), Bit Error Rate, Latency, Ping, Packet Loss, Modulation and Coding Scheme (MCS), Resource Blocks, Layer Num, Packet Loss, Channel Quality, or the like.

At block 206, the process 200 includes sorting a set of candidate drive tests (or their route(s)) based on their respective predictions obtained from the machine learning model, to determine priorities for the candidate drive tests. The sorting can generate one or more dynamic lists or queues of candidate drive tests for execution, in a sequential, partially overlapping, or parallel manner. The set of candidate drive tests can include the target candidate drive test and other candidate drive test(s) that have been processed with the trained machine learning model.

At block 208, the process 200 includes executing drive tests in accordance with the sorting of their priorities. Whether to execute a candidate drive test can depend on whether it is associated with a priority above a threshold (e.g., a numerical value threshold, a rank threshold in a sorted list or queue, or the like). In some cases, some or all candidate drive tests that are associated with a priority below the threshold are withheld from execution. Based on evaluating or analyzing the withheld candidate(s), adjustment to at least one of a configuration, setting, or arrangement for at least part of the communications network (e.g., directed to geographic unit(s) of the withheld candidate(s)) can be conducted, thus new estimated RF measures can be received for the candidate(s) and new prediction(s) can be obtained based thereon. In some embodiments, the process 200 can proceed back to block 202, where updated training of the machine learning model can be performed based on the ongoing performance of drive testing.

The various operations depicted via FIG. 2, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

Figure 4:
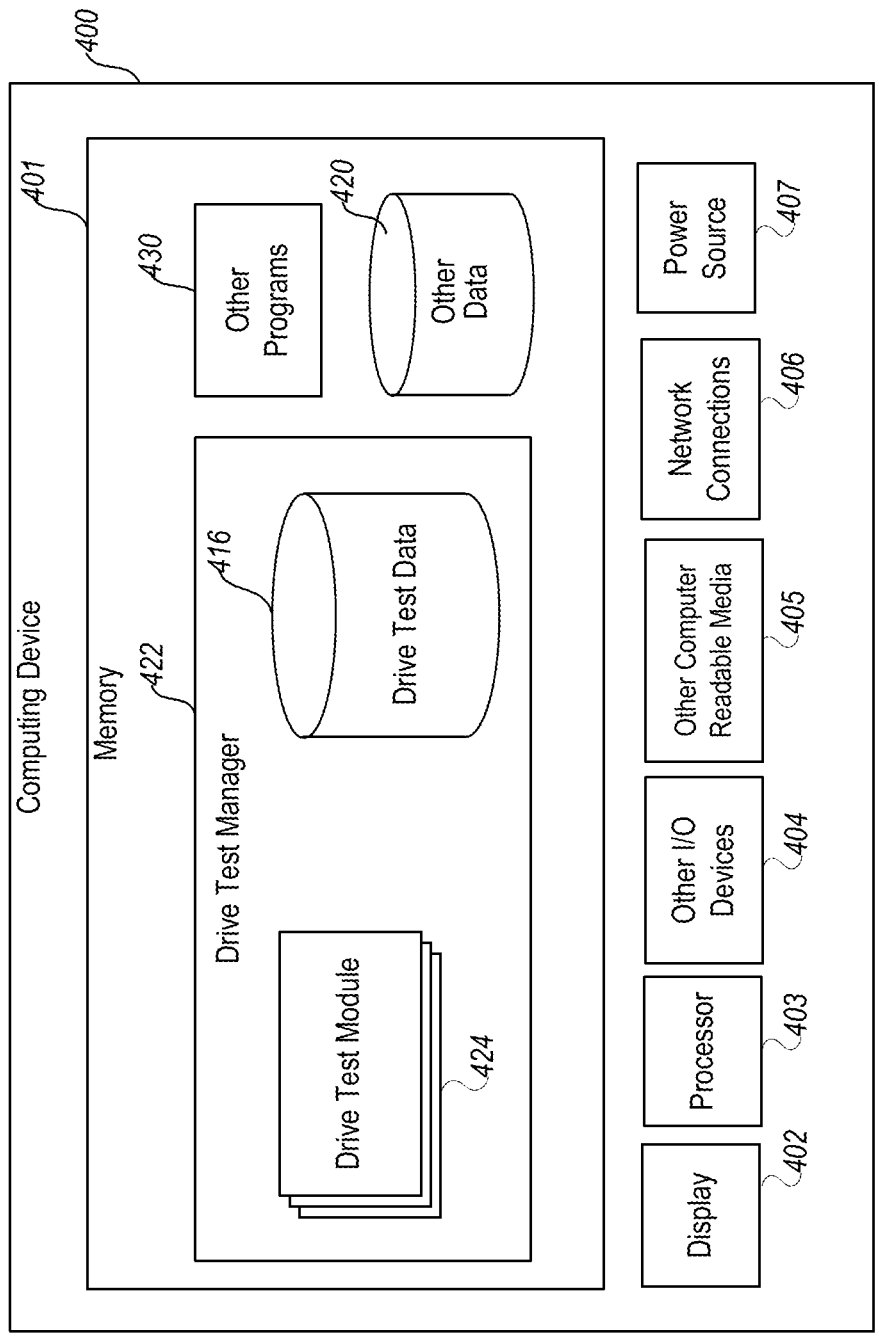
FIG. 4 is a block diagram illustrating elements of an example computing device utilized in accordance with some embodiments of the techniques described herein.

FIG. 4 is a block diagram illustrating elements of an example computing device or system 400 utilized in accordance with some embodiments of the techniques described herein. Illustratively, the computing device 400 corresponds to a drive test service 102, one of test drive devices 124a-124c, or at least a part thereof.

In some embodiments, one or more general purpose or special purpose computing systems or devices may be used to implement the computing device 400. In addition, in some embodiments, the computing device 400 may comprise one or more distinct computing systems or devices, and may span distributed locations. Furthermore, each block shown in FIG. 4 may represent one or more such blocks as appropriate to a specific embodiment or may be combined with other blocks. Also, the drive test manager 422 may be implemented in software, hardware, firmware, or in some combination to achieve the capabilities described herein.

As shown, the computing device 400 comprises a computer memory ("memory") 401, a display 402 (including, but not limited to a light emitting diode (LED) panel, cathode ray tube (CRT) display, liquid crystal display (LCD), touch screen display, projector, etc.), one or more Central Processing Units (CPU) or other processors 403, Input/Output (I/O) devices 404 (e.g., keyboard, mouse, RF or infrared receiver, universal serial bus (USB) ports, High-Definition Multimedia Interface (HDMI) ports, other communication ports, and the like), other computer-readable media 405, network connections 406, a power source (or interface to a power source) 407. The drive test manager 422 is shown residing in memory 401. In other embodiments, some portion of the contents and some, or all, of the components of the drive test manager 422 may be stored on and/or transmitted over the other computer-readable media 405. The components of the computing device 400 and drive test manager 422 can execute on one or more processors 403 and implement applicable functions described herein. In some embodiments, the drive test manager 422 may operate as, be part of, or work in conjunction and/or cooperation with other software applications stored in memory 401 or on various other computing devices. In some embodiments, the drive test manager 422 also facilitates communication with peripheral devices via the I/O devices 404, or with another device or system via the network connections 406.

The one or more drive test modules 424 is configured to perform actions related, directly or indirectly, to the RF and drive test data integration, machine learning model training, machine learning model deployment and execution, drive test prioritization, or other aspects of the technology described herein. In some embodiments, the drive test module(s) 424 stores, retrieves, or otherwise accesses at least some RF, machine learning model, or drive test-related data on some portion of the drive test data storage 416 or other data storage internal or external to the computing device 400. In various embodiments, at least some of the drive test modules 424 may be implemented in software or hardware.

Other code or programs 430 (e.g., further data processing modules, communication modules, a Web server, and the like), and potentially other data repositories, such as data repository 420 for storing other data, may also reside in the memory 401, and can execute on one or more processors 403. Of note, one or more of the components in FIG. 4 may or may not be present in any specific implementation. For example, some embodiments may not provide other computer readable media 405 or a display 402.

In some embodiments, the computing device 400 and drive test manager 422 include API(s) that provides programmatic access to add, remove, or change one or more functions of the computing device 400. In some embodiments, components/modules of the computing device 400 and drive test manager 422 are implemented using standard programming techniques. For example, the drive test manager 422 may be implemented as an executable running on the processor(s) 403, along with one or more static or dynamic libraries. In other embodiments, the computing device 400 and drive test manager 422 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Python, Spark, Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 400 to perform the functions of the drive test manager 422. In some embodiments, instructions cause the one or more processors 403 or some other processor(s), such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported by a drive test manager 422 implementation. Also, other functions could be implemented and/or performed by each component/module, and in different orders, and by different components/modules, yet still achieve the functions of the computing device 400 and drive test manager 422.

In addition, programming interfaces to the data stored as part of the computing device 400 and drive test manager 422, can be available by standard mechanisms such as through Python, Spark, C, C++, C#, and Java APIs; libraries for accessing files, databases, or other data repositories; scripting languages such as XML; or Web servers, FTP servers, NFS file servers, or other types of servers providing access to stored data. The drive test data storage 416 and data repository 420 may be implemented as one or more database systems, file systems, or any other technique for storing such information, or any combination of the above, including implementations using distributed computing techniques. Illustratively, at least some data can be stored in "csv" or "parquet" format.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the drive test manager 422.

Furthermore, in some embodiments, some or all of the components of the computing device 400 and drive test manager 422 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for prioritizing drive tests for a communications network, the method comprising:
    feeding a representation of one or more routes of a target candidate drive test for the communications network to a trained machine learning model to obtain a drive test prediction for the target candidate drive test, wherein the trained machine learning model is trained based on integrating estimated radio frequency (RF) measurements with past drive test data;
    sorting a set of candidate drive tests for the communications network including the target candidate drive test, based on drive test predictions associated with each candidate drive test of the set of candidate drive tests, to determine priorities for executing drive tests; and
    causing performance of drive testing for the communications network in accordance with the priorities.

2. The method of claim 1, wherein feeding the representation of one or more routes of the target candidate drive test to the trained machine learning model comprises determining at least one of a shape, coordinates, direction, or geographic location associated with the one or more routes.

3. The method of claim 2, wherein feeding the representation of one or more routes of the target candidate drive test to the trained machine learning model further comprises obtaining estimated RF measurements for the target candidate drive test based on the at least one of a shape, coordinates, direction, or geographic location.

4. The method of claim 3, wherein feeding the representation of the one or more routes of the target candidate drive test to the trained machine learning model further comprises inputting at least the estimated RF measurements for the target candidate drive test into the trained machine learning model.

5. The method of claim 1, wherein the drive test prediction for the target candidate drive test includes at least one of a distribution of predicted successes among fractions of the one or more routes, an unweighted overall predicted success rate for the target candidate drive test, or a weighted overall predicted success rate for the target candidate drive test.

6. The method of claim 1, wherein causing performance of drive testing for the communications network in accordance with the priorities comprises causing execution of one or more candidate drive tests each associated with a priority above a threshold.

7. The method of claim 6, further comprising:
withholding at least one candidate drive test that is associated with a priority below the threshold;
determining at least one part of the communications network corresponding to the at least one candidate drive test that is associated with a priority below the threshold; and
causing adjustment to at least one of a configuration, setting, or arrangement for the at least one part of the communications network.

8. The method of claim 1, further comprising causing updated training of the machine learning model based on the performance of drive testing.

9. A drive test system for a communications network, comprising:
at least one memory that stores computer executable instructions; and
at least one processor that executes the computer executable instructions to cause actions to be performed, the actions comprising:
feeding a representation of one or more routes of a target candidate drive test for the communications network to a trained machine learning model to obtain a drive test prediction for the target candidate drive test, wherein the trained machine learning model is trained based on integrating estimated radio frequency (RF) measurements with past drive test data;
sorting a set of candidate drive tests for the communications network including the target candidate drive test, based on drive test predictions associated with each candidate drive test of the set of candidate drive tests, to determine priorities for executing drive tests; and
causing performance of drive testing for the communications network in accordance with the priorities.

10. The system of claim 9, wherein feeding the representation of one or more routes of the target candidate drive test to the trained machine learning model comprises obtaining estimated RF measurements for the target candidate drive test based on the one or more routes.

11. The system of claim 10, wherein feeding the representation of the one or more routes of the target candidate drive test to the trained machine learning model further comprises inputting at least the estimated RF measurements for the target candidate drive test into the trained machine learning model.

12. The system of claim 9, wherein the drive test prediction for the target candidate drive test includes predicted measurements of at least one of Received Signal Strength Indicator (RSSI), Reference Signal Receive Power (RSRP), Signal-to-Noise Ratio (SNR), Bit Error Rate, Latency, Ping, Packet Loss, Modulation and Coding Scheme (MCS), Resource Blocks, Layer Num, Packet Loss, or Channel Quality.

13. The system of claim 9, wherein causing performance of drive testing for the communications network in accordance with the priorities comprises causing execution of one or more candidate drive tests each associated with a priority above a threshold.

14. The system of claim 13, wherein the actions further comprise:
withholding at least one candidate drive test that is associated with a priority below the threshold;
determining at least one part of the communications network corresponding to the at least one candidate drive test that is associated with a priority below the threshold; and
causing adjustment to at least one of a configuration, setting, or arrangement for the at least one part of the communications network.

15. The system of claim 9, wherein the actions further comprise causing updated training of the machine learning model based on the performance of drive testing.

16. A non-transitory computer-readable medium storing contents that, when executed by one or more processors, cause actions to be performed, the actions comprising:
feeding a representation of one or more routes of a target candidate drive test for the communications network to a trained machine learning model to obtain a drive test prediction for the target candidate drive test, wherein the trained machine learning model is trained based on integrating estimated radio frequency (RF) measurements with past drive test data;
sorting a set of candidate drive tests for the communications network including the target candidate drive test, based on drive test predictions associated with each candidate drive test of the set of candidate drive tests, to determine priorities for executing drive tests; and
causing performance of drive testing for the communications network in accordance with the priorities.

17. The computer-readable medium of claim 16, wherein the representation of one or more routes of the target candidate includes estimated RF measurements associated with the one or more routes.

18. The computer-readable medium of claim 16, wherein the drive test prediction for the target candidate drive test includes at least one of a distribution of predicted successes among fractions of the one or more routes, an unweighted overall predicted success rate for the target candidate drive test, or a weighted overall predicted success rate for the target candidate drive test.

19. The computer-readable medium of claim 16, wherein causing performance of drive testing for the communications network in accordance with the priorities comprises causing execution of one or more candidate drive tests each associated with a priority above a threshold.

20. The computer-readable medium of claim 19, wherein the actions further comprise:
witholding at least one candidate drive test that is associated with a priority below the threshold;
determining at least one part of the communications network corresponding to the at least one candidate drive test that is associated with a priority below the threshold; and
causing adjustment to at least one of a configuration, setting, or arrangement for the at least one part of the communications network.

* * * * *